US009099015B2

(12) United States Patent
Liang et al.

(10) Patent No.: US 9,099,015 B2

(45) Date of Patent: Aug. 4, 2015

(54) SYSTEM, METHOD, APPARATUS, AND COMPUTER PROGRAM FOR INTERACTIVE PRE-OPERATIVE ASSESSMENT INVOLVING SAFETY MARGINS AND CUTTING PLANES IN RENDERED 3D SPACE

(75) Inventors: Cheng-Chung Liang, West Windsor, NJ (US); Li Fan, Belle Mead, NJ (US); Guo-Qing Wei, Plainsboro, NJ (US); Changbo Yang, Wayne, PA (US); Jian-Zhong Qian, Princeton Junction, NJ (US); Xiaolan Zeng, Princeton, NJ (US)

(73) Assignee: EDDA TECHNOLOGY, INC., Princeton, NJ (US)

( * ) Notice: Subject to any disclaimer, the term of this patent is extended or adjusted under 35 U.S.C. 154(b) by 476 days.

(21) Appl. No.: 12/778,937

(22) Filed: May 12, 2010

(65) Prior Publication Data

US 2010/0316268 A1 Dec. 16, 2010

Related U.S. Application Data

(60) Provisional application No. 61/177,461, filed on May 12, 2009.

(51) Int. Cl.
*G09B 23/28* (2006.01)
*G06T 19/00* (2011.01)

(52) U.S. Cl.
CPC .............. *G09B 23/286* (2013.01); *G06T 19/00* (2013.01); *G06T 2210/41* (2013.01); *G06T 2219/008* (2013.01); *G06T 2219/2012* (2013.01)

(58) Field of Classification Search
CPC ......... A61B 6/466; G06T 15/00; G06T 19/00
See application file for complete search history.

(56) References Cited

U.S. PATENT DOCUMENTS 7,315,304 B2 1/2008 Liang et al. .................. 345/426
7,359,538 B2 4/2008 Zeng et al.

(Continued)

FOREIGN PATENT DOCUMENTS

CN 1639675 A 7/2005
CN 101073097 A 11/2007
WO WO 2007/002562 A2 1/2007

OTHER PUBLICATIONS

Gering, D., A System for Surgical Planning and Guidance using Image Fusion and Interventional MR, Dec. 1999, MIT, Department of Electrical Engineering and Computer Science, Master Thesis, pp. 1-106.*

Bernard Reitinger et al., "Liver Surgery Planning Using Virtual Reality", Virtual and Augmented Reality Supported Simulators, IEEE Computer Society, Nov./Dec. 2006, pp. 36-47.

(Continued)

*Primary Examiner* — Said Broome

(74) *Attorney, Agent, or Firm* — Fitzpatrick, Cella, Harper & Scinto

(57) ABSTRACT

A procedure for pre-operating assessment of one or more anatomical structures generated from medical images and provided in a rendered 3D space, and an imaging system, apparatus, and computer program, that operate in accordance with the procedure. The procedure comprises providing one or more safety margin indicators in the rendered 3D space, each having a shape corresponding to that of a respective one of the anatomical structures within an organ and having a predetermined size of safety margin from the respective one of the anatomical structures. The procedure also comprises manipulating at least one of the shape and predetermined size of safety margin of at least one of the safety margin indicators in the rendered 3D space, and immediately providing a rendering in the 3D space of a manipulated version of the at least one safety margin indicator. Also provided is a procedure for defining at least one cutting surface to resect one or more medical anatomical structures using an imaging system.

20 Claims, 11 Drawing Sheets

103

101

102

(56) References Cited

U.S. PATENT DOCUMENTS

| | | | | |
|---|---|---|---|---|
| 7,450,749 | B2 | 11/2008 | Rouet et al. | 382/154 |
| 2004/0152970 | A1 * | 8/2004 | Hunter et al. | 600/424 |
| 2005/0251038 | A1 | 11/2005 | Liang et al. | 600/437 |
| 2007/0279436 | A1 * | 12/2007 | Ng et al. | 345/624 |
| 2007/0291000 | A1 | 12/2007 | Liang et al. | |
| 2008/0049999 | A1 | 2/2008 | Jerebko et al. | |
| 2008/0103385 | A1 * | 5/2008 | Ma et al. | 600/416 |

OTHER PUBLICATIONS

Notification of First Office Action issued in connection with Chinese Application No. CN 201080021064.X on Jul. 22, 2013 (24 sheets), and English Translation (30 sheets).

E.W. Dijkstra "A Note on Two Problems in Connection with Graphs", Jun. 11, 1959, Numerische Mathematik 1, pp. 269-271.

N. Baba et al. "Stellar speckle image reconstruction by the shift-and-add method", May 15, 1985, Applied Optics, vol. 24, No. 10, pp. 1403-1405 (1985).

T.M. Cover and P.E. Hart "Nearest neighbor pattern classification", Jan. 1, 1967, IEEE Transactions of Information Theory, vol. IT-13, No. 1, pp. 21-27.

Notification of Second Office Action issued in connection with Chinese Application No. CN 201080021064.X on May 12, 2014 (25 sheets), and English Translation (32 sheets), (Chinese Office Action).

David T. Gering "A System for Surgical Planning and Guidance using Image Fusion and Interventional MR", Dec. 1999.

* cited by examiner

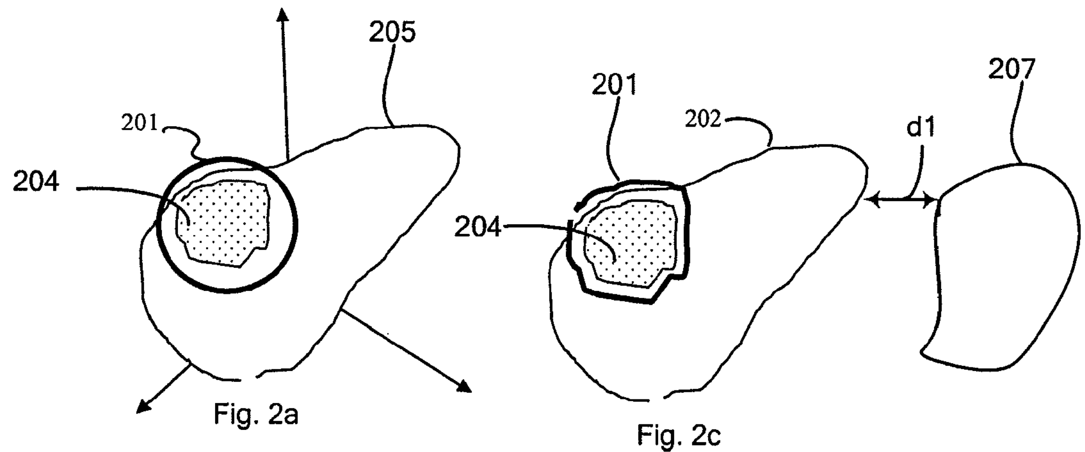
Fig. 2a
Fig. 2c
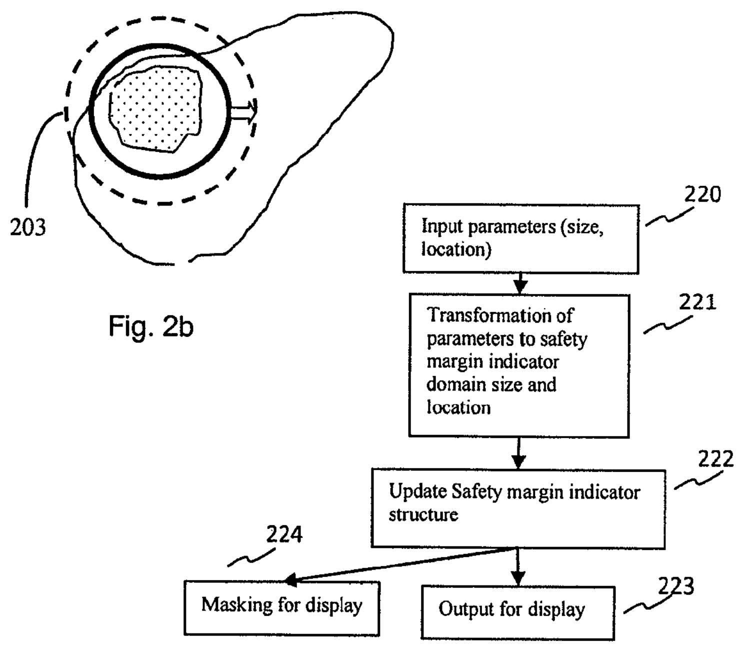
Fig. 2b
Fig. 2d

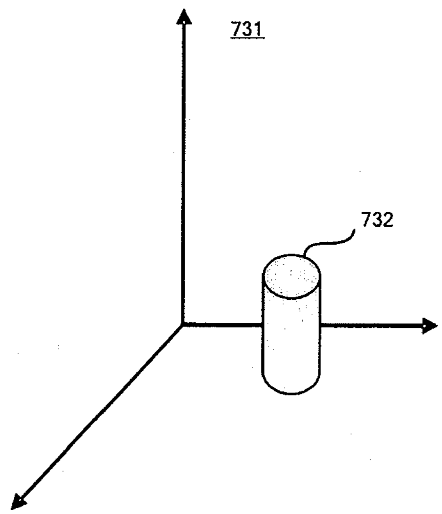
Fig.7(b)1
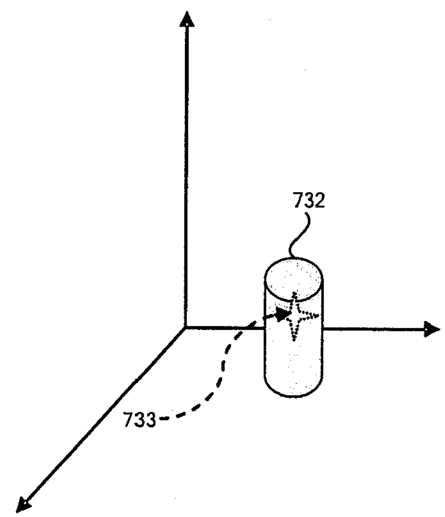
Fig. 7(b)2
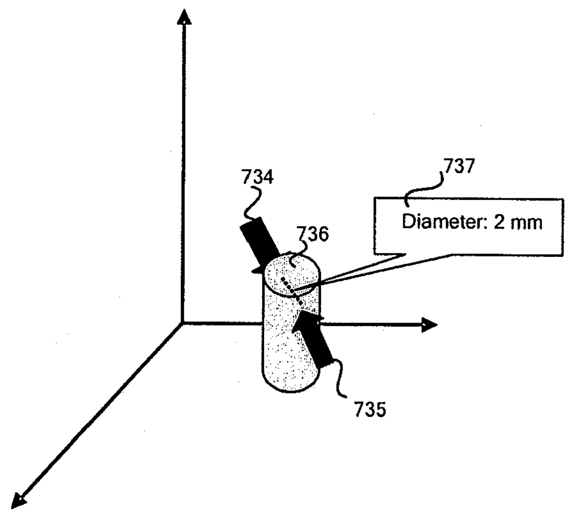
Fig. 7(b)3
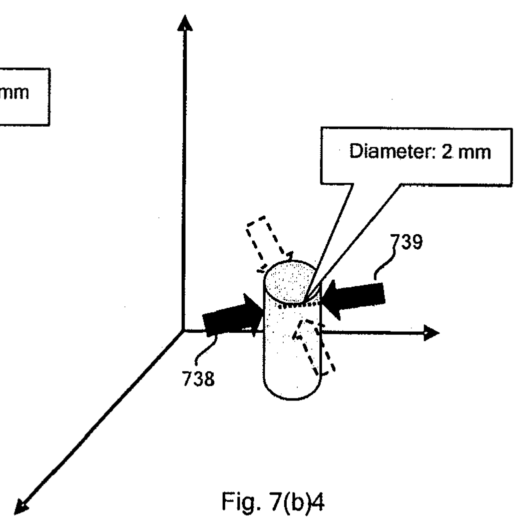
Fig. 7(b)4

SYSTEM, METHOD, APPARATUS, AND COMPUTER PROGRAM FOR INTERACTIVE PRE-OPERATIVE ASSESSMENT INVOLVING SAFETY MARGINS AND CUTTING PLANES IN RENDERED 3D SPACE

CROSS REFERENCE TO RELATED APPLICATION

The present application claims priority to U.S. Provisional Patent Application No. 61/177,461, filed May 12, 2009, the contents of which are incorporated by reference herein in their entireties, as if set forth fully herein.

BACKGROUND

1. Technical Field

Example aspects described herein relate to medical image processing, and, in particular, relate to a procedure, apparatus, system, and computer program, for facilitating interactive pre-operative assessments using manipulative, visually perceptible models of anatomical structures.

2. Description of Related Art

Liver tumor resection can be an efficient treatment method for addressing liver cancer. Before surgery, physicians need to carefully evaluate a hepatic lesion or tumor to be re-sectioned, the volume of the expected remaining liver segments, how a proposed resection is going to affect nearby vascular structures and corresponding blood supply/drainage regions, and how the resection will affect biliary systems, for example. Such comprehensive assessments can be helpful in determining an optimal operative plan.

Whether or not a resection will be suitable for a particular patient can depend on a number of factors, such as, for example, the location of a tumor, its size, and the quality of expected post-operative liver function. Pre-surgical planning is therefore important. During the planning stage, a surgeon has to understand the spatial relationships between tumors and surrounding vessel structures. To enable a surgeon to do so, tools and systems that are capable of assisting and enabling the surgeon to define a surface that separates tumors and corresponding diseased tissue from the rest of healthy liver tissue, are needed, as are tools for measuring the size and/or volume of the affected areas and/or distances between the affected areas and nearby structures. It has been a challenge in the past to provide tools having such capabilities, and which can be operated intuitively and in a user work-flow-friendly manner. As is commonly known, ease-of-use is an important factor in terms of whether a physician can effectively evaluate different scenarios to determine a best resection procedure based on various information from different sources.

Traditional, available commercial products in this area are mostly based primarily on 2D display technology that provides a user with a view having axial slices. The user can operate a user interface to scroll up and down within the display to view different structures in a sliced arrangement along an axial direction. Such conventional products also provide drawing tools that enable a user to draw separating curves in different slices. A corresponding 3D separating surface can then be interpolated computationally based on multiple curves drawn in different slices, but is not visible. With such a generated separating surface, the volume of the underlying target object or a virtual resection within the confines of the separating surface can be calculated. Because such a separating surface is not visible, the user is required to imagine in his/her mind, while making the 2D drawings, the possible outcome in 3D space. Thus the conventional 2D approach is not intuitive and is difficult to apply.

Bernard Retinger, et al. "Liver Surgery Planning using Virtual Reality," IEEE Computer Graphics and Application, November/December 2006] refers to a virtual reality environment that purportedly enables a user to perform some 3D operations directly in a 3D virtual reality space. However, the environment requires users to wear stereo goggles and to use special 3D tracking devices which are not generally available.

SUMMARY

Existing limitations associated with the foregoing, and other limitations, can be overcome by a procedure for pre-operating assessment of one or more anatomical structures generated from medical images and provided in a rendered 3D space, and an imaging system, apparatus, and computer program, that operate in accordance with the procedure, wherein each has a 3D capability not limited by the above limitations. In one example embodiment, the procedure comprises providing one or more safety margin indicators in the rendered 3D space, each having a shape corresponding to that of a respective one of the anatomical structures within an organ and having a predetermined size of safety margin from the respective one of the anatomical structures. The procedure also comprises manipulating at least one of the shape and predetermined size of safety margin of at least one of the safety margin indicators in the rendered 3D space, and immediately providing a rendering in the 3D space of a manipulated version of the at least one safety margin indicator.

The safety margin indicator can be provided in a 2D view on the medical images, rendered in its original or processed form, and in a 3D view, and the manipulating can include adjusting at least one of the shape and location of the at least one safety margin indicator.

According to one exemplary embodiment, the procedure further comprises providing at least one numerical dimension of the safety margin indicator, and additionally comprises changing at least one of a color and an appearance of the 3D rendering of at least one of the anatomical structures, and/or by masking one or more structures.

A procedure according to another exemplary embodiment herein defines at least one cutting surface to resect one or more medical anatomical structures using an imaging system. The procedure comprises forming at least one cutting surface in one of a 2D view and a 3D view of a rendered 3D space in the imaging system, automatically providing a 3D rendering or a 2D rendering, respectively, of the at least one cutting surface, interactively manipulating the at least one cutting surface to adjust at least one of its orientation, shape, and location, using graphical handlers, and immediately providing a rendering in the 3D space of a manipulated version of the at least one cutting surface.

The procedure also can include identifying corresponding parts of the anatomical structures between the 2D and 3D views, and the forming can be performed using at least one of a plane and a template defining the cutting surface.

The forming forms at least one cutting surface in at least one of the anatomical structures, and the procedure also can vary an orientation of the at least one anatomical structure, wherein the forming forms at least one cutting surface in the anatomical structure, for each orientation.

As a further example, the procedure can comprise separating the at least one anatomical structure into at least two parts, along the at least one cutting surface, and/or re-coupling the at least two parts of the anatomical structure. At least one of a color and an appearance of at least one of the parts also can be changed.

Additionally, sub-structures (e.g., vascular branches or the like) located in an interior of the anatomical structure model, can be separated into portions, and an indicator can be provided of at least one dimensional characteristic of at least one of the sub-structures. In one example, the dimensional characteristic includes a diameter of a cross section of the at least one sub-structure, that cross section can be interactively selected at a location along the at least one sub-structure, and, in one example embodiment, the at least one sub-structure can be automatically rotated in response to the selecting.

BRIEF DESCRIPTION OF THE DRAWINGS

The teachings claimed and/or described herein are further described in terms of exemplary embodiments. These exemplary embodiments are described in detail with reference to the accompanying drawings. These embodiments are non-limiting exemplary embodiments, in which like reference numerals represent similar structures throughout the several views of the drawings.

FIGS. 2*a* to 2*c* show a safety margin indicator in association with an anatomical structure, according to an exemplary embodiment herein.

FIG. 2*d* shows a flow diagram according to an example embodiment herein, for manipulating a safety margin indicator.

FIGS. 7(*b*)-1 to 7(*b*)-4 represent a workflow for measuring a diameter of a structure, such as a tube-like structure, according to an exemplary embodiment herein.

FIG. 7(*c*) depicts a flow diagram for measuring a diameter.

DETAILED DESCRIPTION

Exemplary aspects described herein relate to methods, systems, apparatuses, and computer programs, that facilitate pre-operative assessments in an intuitive, interactive, and real-time manner. These exemplary aspects can be used to facilitate hepatic lesion/tumor resection planning based upon quantitative assessment and evaluation of anatomic structures and other tissue, such as, for example (and without limitation), the liver, liver segments, vascular structures, vascular territory, biliary structures, and hepatic lesions, as well as the spatial relationships among them. These aspects also can provide an intuitive 3D working environment and can be used to fuse 3D and 2D information to perform efficient resection evaluation and analysis.

Figure 8:
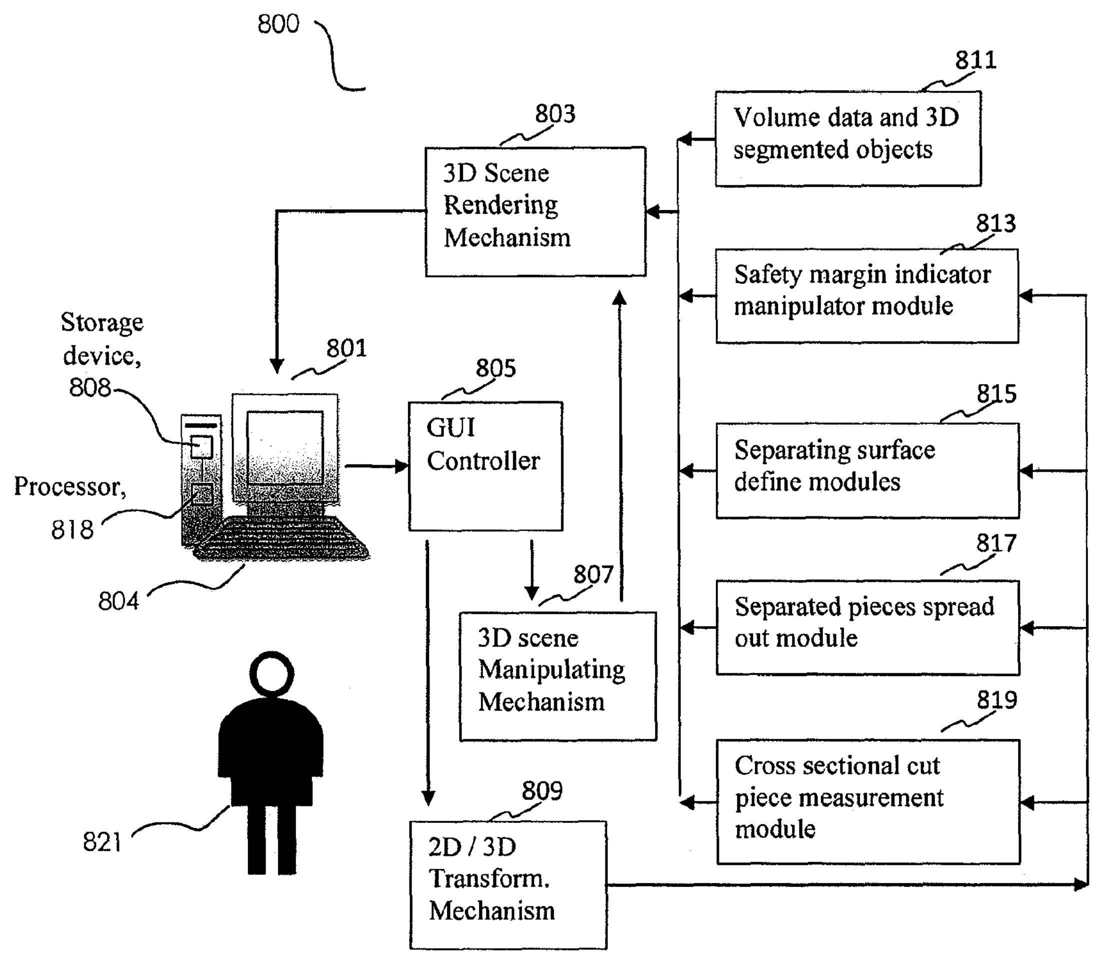
FIG. 8 depicts a system according to an exemplary embodiment herein.

FIG. 8 depicts a construct of an exemplary medical imaging system 800 according to an exemplary embodiment herein, and which can be used to conduct, among other things, pre-operative assessments. The system 800 comprises one or more user interfaces such as a display device 801, and also comprises a Graphical user interface (GUI) controller 805, a 3D scene manipulating mechanism 807, a 2D/3D transformation mechanism 809, a 3D scene rendering mechanism 803, a safety margin indicator manipulation mechanism 813, a separating surface defining mechanism 815, a cut spread out mechanism 817, a volume/segmented object input module 811, and a cross-sectional cut piece mechanism 819. A user 821 may interact with the system 800 via at least one user interface, including an input user interface and an output user interface. In one example embodiment, the input user interface can include at least one of a user-operable slider control, a track ball, a keyboard, control stick, an input user interface provided by way of the display device 801, and/or any other suitable type of user input mechanism, and the output user interface can be provided by way of the device 801 and/or any other suitable type of interface capable of providing a user-perceptible output. For convenience, the input user interface is identified in FIG. 8 by reference numeral 804 associated with a keyboard, although it should be noted that the user input interface can include any one or more of the foregoing types of input user interfaces, and is not limited to a keyboard.

When the user 821 operates the input user interface (also referred to interchangeably hereinafter as a "user interface") 804 to manipulate a scene, such as a 3D scene, the controller 805 (which can control interaction between the system 800 and user 821) activates the 3D scene manipulating mechanism 807, which, in turn, invokes a 3D scene rendering mechanism 803. The system 800 can load in volume data and segmented 3D objects from volume/segmented object input module 811, and render such objects via the 3D scene rendering mechanism 803. The mechanism 803 operates based on outputs from components 807 and 811 to manipulate a 3D scene rendered on display device 801. Data rendering may be carried out dynamically and data to be rendered may also change. For example, when user 821 rotates a 3D volume presented on display device 801, the original rendering may need to be updated (and can be updated) to reflect the change in appearance of the data due to the rotation. Accordingly, due to the rotation, 2D cross sections to be rendered may also change.

The user 821 also can specify the performance of various other functions, including a function to define separating surfaces, safety margins, and the like, as will be described in more detail below. When the user 821 selects any such functions, such as in a 2D rendering presented on display device 801, the system 800 converts the user's input signal using 2D/3D transformation mechanism 809 and sends the converted signal to one or more corresponding ones of a safety margin manipulator mechanism 813, separating surface defining mechanism 815, a cut spread out mechanism 817, and a cross-sectional cut piece measurement mechanism 819, depending on the specific function specified by the user 821. If the user 821 specifies a resection function, for example, the user 821 may request the system 800 to load in volume data and segmented 3D objects from volume/segmented object input module 811, and render such objects via the 3D scene rendering mechanism 803, based on the information from the module 811 and outputs from one or more of the applicable modules 813, 815, 817, 819. The mechanism 803 operates based on outputs from components 811 and one or more of the components 813, 815, 817, and 819, to conduct the function specified by the user 821.

In the illustrated embodiment, display device 801 is part of a data processing system that includes the device 801, the user interface 804, and at least one storage device (memory) 808, each of which is bidirectionally coupled to a processor 818 of the data processing system. Processor 818 also can be coupled to external Input/Output (I/O) devices (not shown) and a communications interface device (not shown), at least one of which enables the data processing system to communicate with other elements external thereto, such as, for example, a network.

The storage device 808 has a computer-readable medium, and is used by the processor 818 to store and read/write data, as well as computer-readable program instructions used to implement the procedure(s) described herein and shown in the accompanying drawing(s). In operation, processor 818 executes the program instructions to perform any of the example procedure(s) described herein, for operating the overall system 800.

The modules 803 and 805 to 819 of FIG. 8 each may include software, hardware, or a combination thereof, and at least some of those elements 803 and 805 to 819 (although represented outside of the device 801 for illustrative purposes), may be incorporated within the data processing system. As one example, those modules may be embodied, at least in part, in the computer program instructions stored in the storage device 808, or can be hardware components located in or in association with the processor 818.

Figure 1:
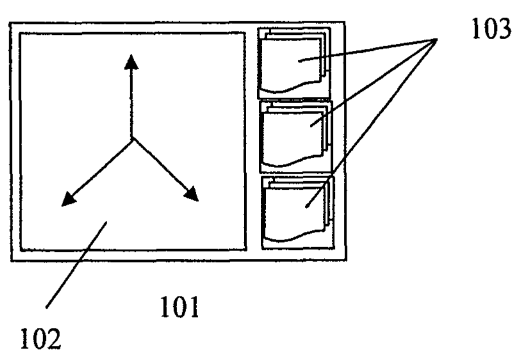
FIG. 1 shows an example of a screen layout, according to an example embodiment herein.

Having described the system 800 of FIG. 8, an aspect relating to the display functionality of the system 800 will now be described in conjunction with FIGS. 1 and 8. Resection medical procedures performed on actual human or animal patients are, of course, conducted in physical 3D space. The exemplary aspects described herein can model such activities in a 3D model working environment on the display of a computing device (e.g., such as the display device 801 of the system 800 represented in FIG. 8). FIG. 1 depicts a computing device display 101, which, in one example, is a further representation of the display device 801 of FIG. 8. The device 101 of FIG. 1 includes a 3D display region 102 (also referred to as a "working environment") wherein a 3D volume can be rendered, and a separate display region that includes plural sub-regions 103 in which respective 2D cross-sectional views can be displayed, each corresponding to the volume represented in region 102, as viewed from particular perspectives (i.e., at different angles). In one exemplary embodiment, the views shown in sub-regions 103 are taken from perspectives that are perpendicular to (and looking in general towards) respective ones of three axes represented in region 102, and are orthogonal to one another, although in or embodiments, other, non-orthogonal views can be provided.

The volume that may be rendered in the region 102 can be any applicable object being viewed, and in the context of the present exemplary description, may include one or more anatomic structures or organs, such as, by example only, at least one or more of a liver, a segmented liver after liver resection, one or more related anatomical structures such as lesions (e.g., within the organ(s)), one or more hepatic veins, portal veins, hepatic arteries, biliary tracts, liver lobes, vascular territories, biliary territories and the like. The displayed interspatial relationships among the structures are clearly visible to a viewer. The anatomic structures in the view may be pre-segmented based on scanned volume data either automatically, or via an interactive manual method.

A user, such as user 821 (FIG. 8), can operate the system 800 to rotate and/or zoom a 3D scene (on display device 101) in order to visualize segmented objects from various perspectives to gain a more substantial understanding of the spatial relationships among different segmented structures. The appearance of a segmented object may also be adjusted by the user 821 to opaque, transparent, invisible or the like, using, e.g., associated object controls. In some embodiments, a user may show or hide certain objects to reveal areas that are occluded or see the objects within transparent objects. Examples of these aspects will be further described below.

An exemplary embodiment for enabling a user to define a safety margin will now be described, with reference to FIG. 2*a*, which shows a representation of a safety margin indicator 201 surrounding a lesion or tumor 204 of an anatomical structure 205 (e.g., a liver), depicted in 3D space (i.e., in region 102 of FIG. 1). A safety margin can be useful to define an area for resection, for example, that includes both the lesion or tumor 204 and an additional buffer area around it for additional precautionary reasons. The safety margin indicator 201 shown in the example of FIG. 2*a* is circular in shape or an ovoid; however, it is within the scope of the present invention for the safety margin indicator 201 to have any other suitable shape. As a non-limiting and non-exclusive example, FIG. 2*c* shows a safety margin indicator 201 as has having a dilated shape, and one that follows the overall shape of the lesion or tumor 204. In other words, the margin indicator 201 represented in FIG. 2*c* has a shape that is substantially the same as a shape of the lesion or tumor 204, and, as shown in FIG. 2*c*, the margin indicator 201 is spaced around the lesion or tumor 204 in the rendered 3D space by a predetermined safety margin distance. It also should be understood, that in one example, the safety margin indicator can also be provided in a 2D view of FIG. 1 on medical images, rendered in its original or processed form, in addition to the 3D view.

In one example embodiment herein, the size and shape of the safety margin indicator 201 can be specified and adjusted by the user 821 by way of a user interface (e.g., 804) (using, e.g., module 813 of FIG. 8), and the size and shape also can be adjusted/moved by, for example, the user selecting and dragging a border of the indicator 201 to increase (or decrease) its size, as represented by reference numeral 203 in FIG. 2*b*. A center of the safety margin indicator 201 also can be adjusted by the user operating the user interface 804 to select and drag/move the indicator 201 object in 3D (or 2D) space. The safety margin indicator 201 is displayable in both 3D and 2D in the regions 102 and 103, respectively, and the size, shape, and/or location of the indicator 201, where adjusted by the user (via, e.g., the user interface 804), are updated in the display region(s) substantially instantaneously by the system 800. The foregoing capabilities for adjusting the safety margin indicator 201 can be beneficial when, for example, multiple lesions/tumors, requiring differently sized and/or shaped safety margin indicators, are to be re-sectioned in a single operative setting. Real time visual feedback provided by the system 800 is especially useful when the user interactively adjusts the size or the like of the safety margin indicator 201 as described above. In one example embodiment, this is achieved by setting a zoom factor in a rendering transformation of a 3D computer graphics library (e.g., OpenGL) corresponding to the desired, adjusted size or shape or the like of safety margin indicator 201. With this approach, it is not necessary to use a more time consuming calculation of directly adjusting the size and shape of the safety margin indicator during interactive session. Only when the users specifies the suitable size or other type of adjustment from real time visual feedback, does the system 800 effect the adjustment, in one example.

In accordance with one example embodiment, the numerical dimensions (e.g., diameter, circumference, length, width, location, etc.) of the safety margin indicator 201 are shown in one or more parts (regions 102, 103) of the display device 101. The computer program stored in the storage device 808 of the system 800 operates to continuously monitor those dimensions (for example, this can be accomplished using known dimension measuring techniques), and to cause them to be presented on the display device 101. In other embodiments, they are determined and presented periodically or upon user request.

In a further exemplary embodiment herein, the system 800 can be operated by the user 821 to modify the appearance of one or more anatomical structures 202, 204 depicted on the display device 101, including those within the safety margin indicator 201 (or, in other embodiments, outside of the safety margin indicator). For example, the user 821 can operate the user interface 804 to specify that one or more selected anatomical structures (e.g., 202, 204) be masked and/or presented in a different color or appearance (as non-exclusive examples, opaque, transparent, invisible, hidden) than those of one or more other displayed structures (e.g., lesion 204 and/or other intra-organ anatomical structures can be masked from organ 202, or vice versa), depending on the criteria specified by the user 821, and the system 800 responds by presenting the selected structure(s) in the specified color or appearance. By virtue of this capability, the user can readily discern in an intuitive manner, which structures (e.g., 202, 204) are included within or otherwise affected by the safety margin indicator 201. In one example, in cases where the safety margin indicator 201 is moved by the user (e.g., by way of the user interface 804), then as the indicator 201 moves, the color and/or appearance of anatomical structure portions touched or overlapped by the indicator 201 changes, and/or the color and/or appearance of the structures change when they are disposed within the border of the safety margin indicator 201.

Also, in an exemplary embodiment, one or more quantified measurements such as volumes or other physical characteristics of the parts of structures (e.g., 202, 204) inside the safety margin indicator 201 are calculated and displayed on the display device 101 whenever a user places the indicator 201 over them. In other words, the system 800 calculates (using, e.g., known volume calculation techniques) the volume of any portion of a structure (e.g., 202, 204) included within the margin indicator 201, or, in another example, of any portion touched or overlapped by the indicator 201. In another embodiment, the system 800 performs such a function in response to the user simply operating the user interface 804 to select the structure (e.g., 202, 204), whether or not any part of the structure is located within the safety margin indicator 201, or the function is performed periodically or otherwise automatically. In an example embodiment, the system 800 displays or otherwise outputs a quantified measurement of a masked out anatomical structure, organ, and/or a remnant thereof.

In a further exemplary embodiment, the system 800 can calculate a distance d1 between at least one object of interest (e.g., 202, 204) to at least one neighboring or other structure (e.g., 207 of FIG. 2*c*) specified by the user 821, and that distance is displayed on the display device 101. For example, the user 821 can select that object (e.g., 202, 204) and structure (e.g., 207) by way of the user interface 804, and specify that the distance between them be calculated, in which case the system 800 responds by calculating the distance (using, e.g., known distance calculating techniques) and presenting it on the display device 101. In another example, the system 800 is responsive to the user 821 specifying that the system 800 display a distance between the object of interest (e.g., 202, 204) and a nearest part of a neighboring structure (e.g., 207), by calculating the distance between the object of interest and the nearest structure, and then presenting the calculated distance on the display device 101. Also, in one example, this calculation determines the distance between closest parts of the object (e.g., 202, 204) and structure (e.g., 207). Additionally, in one example embodiment, the system 800 calculates and provides an indication of, a distance between two or more safety margins, and/or a distance between at least one safety margin indicator and, for example, at least one anatomical structure within an organ, the organ itself, and/or other anatomic structures. These functions can be performed automatically or in response to user instructions.

Additionally in an example embodiment, the distance between the safety margin indicator 201 and the structure that it surrounds, such as, e.g., structure 204, can be specified by the user (e.g., via the user interface), and that safety margin indicator automatically becomes adapted so that it is located at that distance from the structure (i.e., the size of the safety margin is adapted). As an example, in FIG. 2*c* the safety margin indicator is shown adapted so that it mirrors the shape of the structure 204, but each part of the indicator is separated from an adjacent surface of the structure 204 by a predetermined distance (e.g., one specified by a user). The shape of the safety margin indicator can be adapted automatically by the system, or can be adapted by the user. Such adjustments can be effected multiple times, depending on, for example, user selection. Additionally, in one example embodiment, more than one safety margin indicator can be displayed in each view, and the system is not limited to showing only a single safety margin indicator. Plural safety margin indicators being shown at once can be useful where, for example, multiple lesions or the like are being analyzed/resected using those indicators.

FIG. 2*d* is an exemplary flow diagram for manipulating a safety margin indicator, such as indicator 201. At step 220, the user 821 operates the user interface 804 (FIG. 8) to input information specifying the manner in which the user desires to manipulate the safety margin indicator 201. For example, this may include the user specifying information such as a desired size, dimension(s), location, and/or shape of the indicator 201. At step 221, the system 800 responds by (where needed) converting the input information using a transformation mechanism to parameters that can be used to manipulate, or fit to, the data structure type of the safety margin indicator 201. Then, at step 222 the data structure defining the safety margin indicator 201 is modified, and the representation of the indicator 201 presented on the display device 101 becomes modified as well, both in accordance with the information specified at step 220. The resulting, modified safety margin indicator 201 is presented on the display device 101 (step 223). Also, in one example, in a case where the user specified at step 220 to change the appearance and/or color (e.g., mask, transparency, or the like, as described above) of displayed structures touching, overlapping, or within the borders of the indicator 201, then at step 224 the color and/or appearance of any such structure(s) is modified accordingly (e.g., in the 3D rendering) on device 101. This can be useful, for example, to mask or otherwise flag affected displayed vascular systems. In one example embodiment, masking can be performed using a standard Boolean AND operation in binary volume space, although in other embodiments, masking can be conducted using other suitable techniques.

Having described the manner in which a safety margin indicator can be formed and manipulated, another exemplary aspect herein will now be described. In accordance with this exemplary aspect, the system 800 enables a user to define one or more separating or resection surfaces (either of which is also referred to herein as a "cutting surface"), whether by using a safety margin indicator 201 as a separating (or resection) surface, and/or another user-defined separating or resection surface, as will be described below. By virtue of this exemplary aspect, the user can operate the user interface 804 to cause the system 800 to automatically generate an optimal cutting surface that enables resection to be performed in an efficient and optimal manner. For example, an optimal cutting surface defined by the user may be one that the user considers will leave a largest volume of remnant structure, while still enabling a sufficient or safe amount of lesion or tumor to be removed. As another example, an optimal cutting surface may one deemed to cause minimal potential encroachment to an underlying vascular system, and may be assessed by evaluating the spatial relationship between a user-confirmed safety margin indicator and a liver parenchyma or the vascular system. Of course, these examples are not exclusive and are not intended to be limiting to the scope of the invention.

Figure 3:
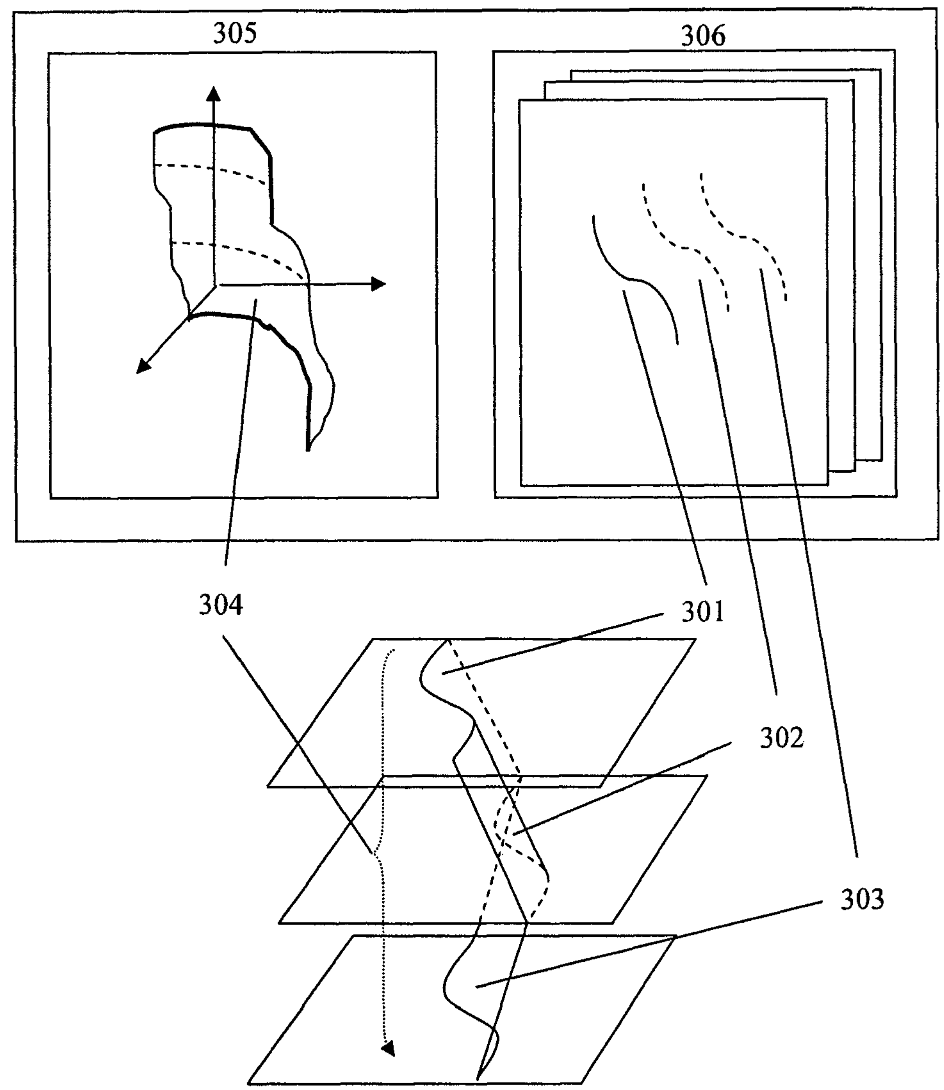
FIG. 3 shows an example representation of a 2D-based separating surface definition and a 3D interpolation thereof, according to an exemplary embodiment herein.

Reference is now made to FIG. 3 for a description of the manner in which a separating or resection surface can be defined, according to one exemplary embodiment herein. In this example, the user can operate the user interface 804 to draw curves to form one or more slices (also referred to herein as "cutting surfaces") 301, 302, 303 in a 2D view 306 (which, in one example, further represents the region 103 of FIG. 1). In response, the system 800 (using, e.g., module 815) interpolates a separating surface 304 in a 3D view 305 (which, in one example, further represents the region 102 of FIG. 1) based on the drawn 2D curve(s). In accordance with an example aspect herein, the resulting 3D view 305 is rendered in real time as the 2D curves are drawn, such that there is a substantially simultaneous rendering of the interpolated 3D surface with respect to the object-of-interest and the object to be re-sectioned. In this manner, an instant 3D visual feedback is made visible to the user while the user is drawing 2D curves, and thus the user does not need to mentally envision the 3D separating surface on his/her own. In one example embodiment, curve interpolation can be done by parametrization. For example, assume there is one curve A in a slice 1 and one curve B in a slice 2. Curve A can be parametrized from 0 to 1 so that each point on the curve has a corresponding parametric value between 0 to 1. Similarly, the same can be done for curve B. An interpolated curve C in a slice 3 can be obtained by using the corresponding points with the same parametric value from curve A and curve B. The slice of the curve C can be linearly interpolated based on the slice positions of slice 1 and slice 2 together with the distances of slice 3 to slice 1 and slice 2. These curves can then be used to construct a 3D surface by stitching or coupling corresponding parametric points between every adjacent pair of curves. In one example, a standard computer graphics technique called triangulation can be used for stitching these curves into a mesh to form a surface.

The system 800 also enables the user to navigate between 2D and 3D views, and to navigate to specific location(s) by cross-referencing the 3D and 2D views. For example, if the user considers a certain part of a resection surface to be unsatisfactory in one view, such as the 3D view 305, then by selecting that part in the 3D view, he/she can be directed by the system 800 to the corresponding 2D axial, saggital, and/or coronal view 306, and adjust the surface if deemed needed. The user also can toggle back and forth between the 2D and 3D views 306, 305 by operating the system 800. If the user selects a 2D image slice of view 306, for example, the corresponding position can be visualized in the 3D space as well, in view 305. The safety margin indicator (e.g., 201 of FIGS. 2*a* to 2*c*), and vascular/biliary territories, can be displayed in both the 3D view 305 and 2D view 306, for use as reference when the user is defining a resection surface.

Figure 4:
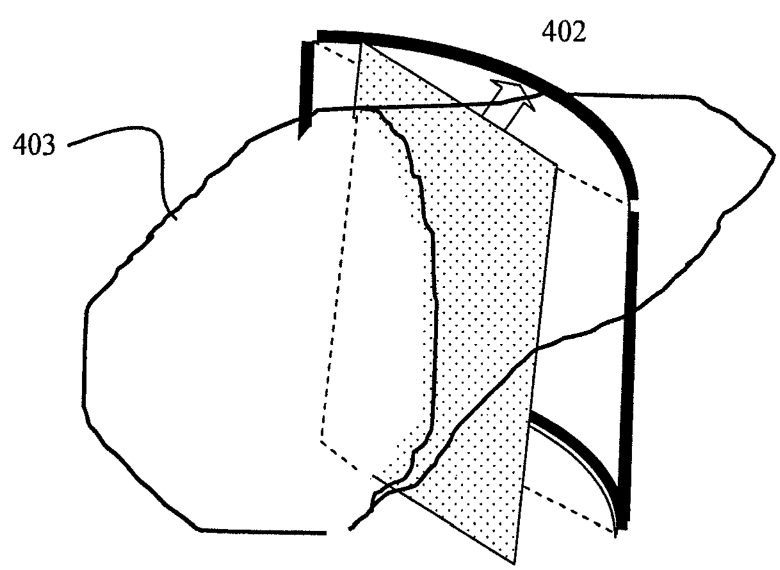
FIG. 4 shows an example representation of a 3D-based adjustable plane separating surface definition, according to an exemplary embodiment herein.

In another exemplary embodiment, a separating or resection surface can be formed using a plane, such as plane 401 illustrated in FIG. 4. In the example of FIG. 4, the plane 401 is a 3D plane that passes through an object 403 to be resectioned, and this forms a cutting plane (e.g., resection or separating plane). By operating the user interface 804 (FIG. 8), for example, the user 821 can adjust the position, orientation, size, thickness, and/or shape of the plane in the 3D view (e.g., view 102 of FIG. 1). In one example, the user also can operate the user interface 804 to bend or otherwise deform the shape of the plane 401 (see, e.g., bended plane 402), from its borders (or from another part of the plane 401), using graphical handlers (see, e.g., the arrow represented in FIG. 4) or some other mechanism. In this manner, the user 821 can perform direct manipulation of the separating plane 401 (or surface) to place it at a desired location and orientation, and also can vary its size, shape, thickness, and dimensions. The plane 401 can be used in conjunction with both 2D and 3D views (see, e.g., FIGS. 1 and 3), and thus the user 821 can interactively make local adjustments to the separation plane 401 in either a 2D or 3D view, in order to, for example, effect separations and the like in a manner that minimizes potential damage to nearby vital anatomies.

In another exemplary embodiment, a user may draw several 3D contours from different viewing angles to define a separation area. For example, while observing an object-of-interest with respect to an object to be re-sectioned in a 3D view, the user may draw a contour in one viewing angle that can separate the object-of-interest from the rest with extended extrusion of the drawn contour along the viewing direction. The user may then rotate the 3D view by another angle and draw another contour to exclude another part. By repeating this process, a final separated piece is the intersection (of several cylinders, in the below example) based on the drawn contours in different viewing angles.

Figure 5:
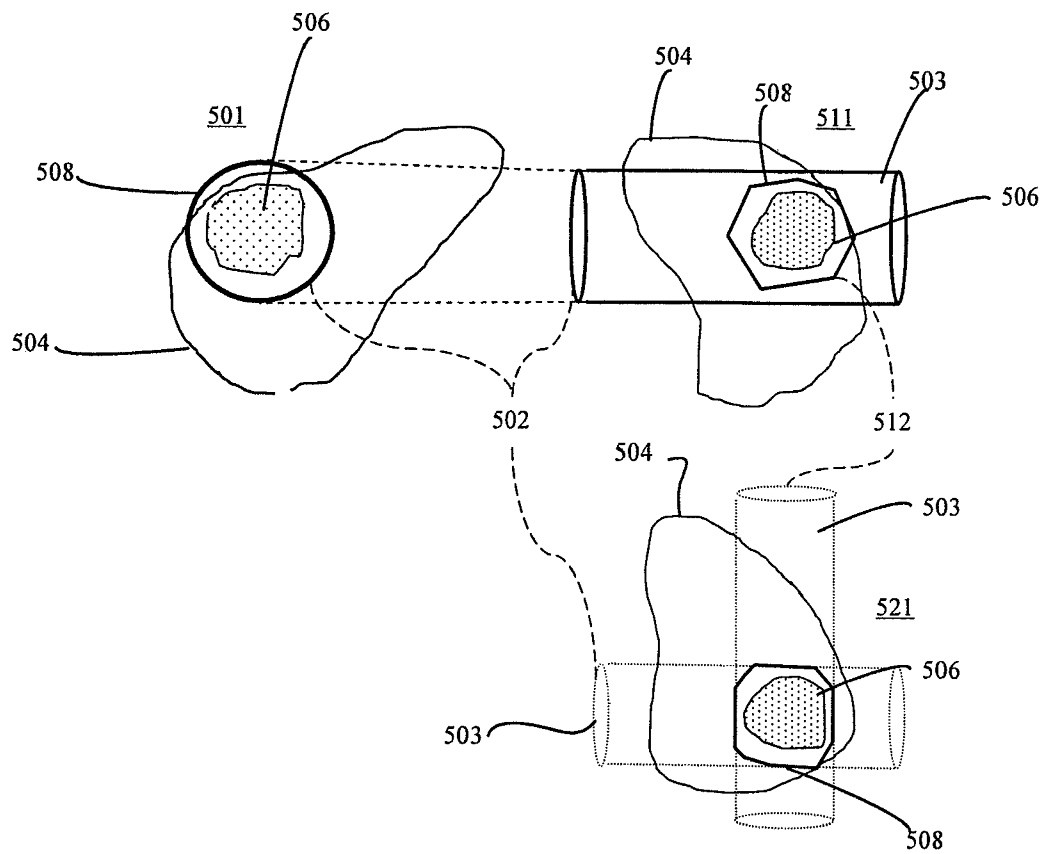
FIG. 5 shows an example representation of a 3D-based contour separating surface definition, according to an exemplary embodiment herein.

This example can be further understood in view of FIG. 5. In that Figure, and merely for ease of understanding, a cylinder 503 is depicted in association with each depicted instance of an anatomical structure 504, lesion or tumor 506, and safety margin indicator 508. The cylinder 503 is shown merely for assisting the reader to understand the 3D interrelationships of the three views of FIG. 5 (labeled as 501, 511, and 521), which represent the mentioned components as viewed from respective, different angles, and in actual usage the cylinders 503 need not be shown. As shown in the upper view 501 of the Figure, a contour 502 is provided in one viewing angle 501 (for example, by the user operating the user interface 804). View 511 shows the components of view 501, after having been rotated (vertically) by the user by about 90 degrees. In the illustrated example, a second contour 512 drawn by the user (e.g., after such rotation) is provided. View 521 represents the components rotated (horizontally) by about 90 degrees by, e.g., the user. The structure 504 is now confined by the two cylinders 503. By being able to manipulate and rotate the components in the respective 3D views directly in this manner, more flexibility can be provided in defining the shape of the separating surface, and the user can be more sure that the separating surface is defined correctly throughout the volume of the structure being separated, because he/she can move/manipulate/rotate the volume and view it from various perspectives. In conjunction with this approach, in one exemplary embodiment 2D Multiple-planar resection (MPR) images, taken from perspectives that are offset perpendicularly (or by some other angle) from the views 501, 511, and 521, can also be displayed (e.g., in region 103 of FIG. 1), so that the user also can use such view(s) as well for reference when defining a cutting contour.

As can be appreciated in view of the above description, the system 800 herein provides a user with great flexibility with respect to how to define separating and resections surfaces. Indeed, in a further exemplary embodiment, the system 800 can be operated to employ one or more predefined templates from among a plurality of available, stored templates, for use in resection planning. The manner in which the template(s) are selected can be done either by user selection, or automatically based on predefined matching criteria. The templates may form different shapes from one another and from any of the shapes described above, and may include, by example only (and without limitation), one or more spherical templates, wedge templates, ellipsoidal templates, bowl template, etc., or any combination(s) thereof.

By operating the user interface 804, the user 821 can adjust the position, orientation, size, thickness, and/or shape of the template in the 3D view (e.g., 102 of FIG. 1), in a similar manner as described above for the plane 401 of FIG. 4. In one example, the user 821 also can operate the user interface 804 to bend or otherwise deform the original shape of the template, from its borders (or from another part of the template), in a similar manner as for plane 401 described above, and the template can define a cutting surface/area. In this manner (and in a similar manner as described above for plane 401), the user 821 can perform direct manipulation to place the separating template at a desired location and orientation, and also can vary its size, shape, thickness, and dimensions. The user can interactively make local adjustments to the separation template in either a 2D or 3D view (e.g., 103, 102 of FIG. 1), in order to, for example, effect separations and the like in a manner that minimizes potential damage to nearby vital anatomies. As but one example, the user can operate the user interface 804 to drag and/or push on one or more surfaces of the template to deform the template to desired shape, and/or drag or push on contours displayed on the 2D cross-sectional display (e.g., 103 of FIG. 1) to effect template shape adjustment. This functionality of the system 800 can be useful in cases where, for example, an atypical separating or resection surface is needed in order to avoid interfering with a vascular branch or the like.

Once a target object is separated (or re-sectioned) by any of the above techniques, the user (e.g., 821) can operate the user interface 804 (FIG. 8) to manipulate the separated pieces as desired in 2D and/or 3D space (e.g., via views 103, 102 of FIG. 1), in order to discern further desired information as deemed necessary to carry out the applicable operative procedure.

Having described exemplary embodiments for defining resection and separating surfaces, exemplary embodiments regarding the performance of resections and separations will now be described.

Figure 6:
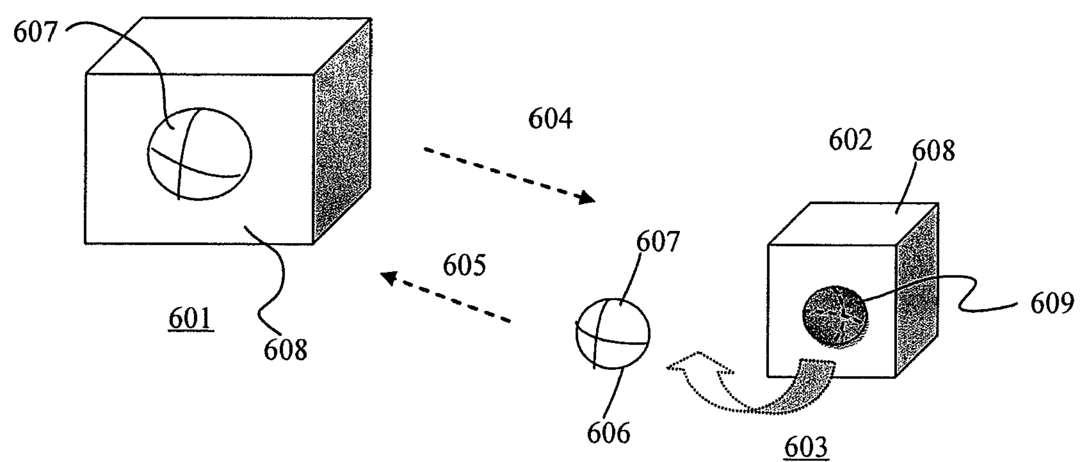
FIG. 6 represents how a piece can be removed from (and placed into) a structure in 3D space, according to an exemplary embodiment herein.

FIG. 6 represents how a piece can be removed from (and replaced to) a structure in 3D space, according to an exemplary embodiment herein. A user can operate the user interface of the system 800 to form a separating surface 606 in any of the above-described manners, and then to separate a portion 607 from an anatomical structure 608 (this procedure is referred to herein, for convenience, as an "opening" operation 604). As shown in FIG. 6, reference numeral 601 represents an original state in which the portion 607 is not yet removed from the structure 608, and reference numeral 603 represents a state after which the portion 607 has been removed from the structure 608, leaving an opening 609. Thus, the system 800 (using, e.g., module 817) effects those operations 601 and 603, and enables the user 821 to perceive the components 607 and 608 as coupled together (601), and as separated from one another (603) in animated form. This procedure also can de-couple and re-couple sub-structures (e.g., intra-organ anatomical structures) within the structure 608, and can enable the user to view removed or remnant portions with corresponding intra-organ anatomies together.

In an exemplary embodiment herein, the system 800 can be operated by the user 821 to modify the appearance of one or more of the portions 607, 608, 609, and/or one or more portions of those components. For example, the user 821 can operate the user interface 804 to specify that one or more selected ones of those components be masked and/or presented in a different color or appearance than one or more other ones of those components, as described above, depending on the particular criteria specified by the user 821, and the system 800 responds accordingly. Thus, as an example, when the two parts 607 and 608 are separated from one another, the user 821, by virtue of such functionality of the system 800, can view the surface 606 of the cut portion 607 in different appearance and/or color than those of components 608 and 609, and can obtain a more direct visual understanding and interpretation about the cut surface area. The user also can operate the user interface 804 to place the portion 607 back into the opening 608 (for convenience, this procedure is referred to as a "closing" operation 605) to view the two pieces 607 and 608 coupled back together again in animated form.

In one example, the "opening" and "closing" procedures can be performed (e.g., by module 817) using a computer program loop with small changes of rendering parameters such as positions of the two pieces, although in other embodiments, other techniques can be employed.

In an additional exemplary embodiment herein, the anatomic structures embedded inside separated components also can be separated into two or more portions. For example, referring to FIG. 7*a*, the user 821 (FIG. 8) can operate the user interface 804 (FIG. 8) to specify that an anatomical structure 704, such as, e.g., a liver, and one or more selected components 705 disposed at least partially in an interior thereof, be separated into at least two parts, and the system 800 responds by performing such separations on display device 801. Again, any one or more of those components specified by the user, and/or one or more portions thereof, such as, e.g., without limitation, a cross section 701, can be masked and/or presented in a different color and/or appearance than one or more other ones of those components, either automatically, or in response to user selection.

Figure 7A:
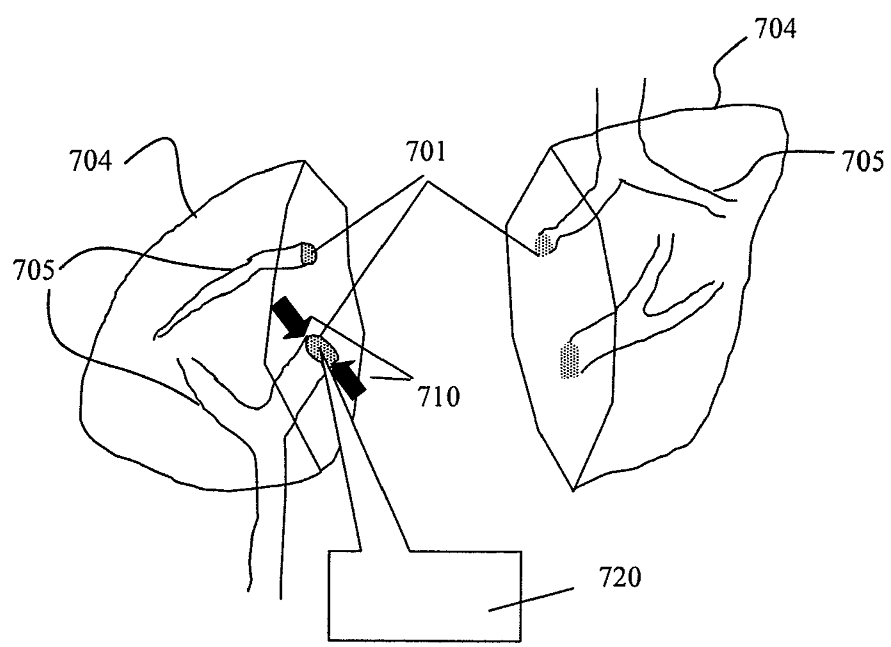
FIG. 7(*a*) depicts separated portions of an anatomical structure, as well as an example of a cross-sectional area measurement of imbedded structures in a cut surface area thereof, according to an exemplary embodiment herein.

Each portion of the anatomic structure(s) shown in FIG. 7*a*, and/or a selected cross section 701 thereof (such as an area to be affected by a resection), also can be measured in a similar manner as described above, for its volume, area, and size/dimensions, or the like. In other words, the system 800 calculates (using, e.g., known calculation techniques) those dimensional characteristics for any user-specified portion(s) of FIG. 7*a*. In response, the system 800 (using, e.g., module 819) responds by calculating the applicable dimensional characteristics and presenting them on the display device 101. For example, in a case where the user selects a particular cross-sectional area, such as one of the cross sectional areas 701, the system 800 analyzes the shape of the applicable cross-sectional area 701 and computes a diameter thereof along one or more directions, such as, e.g., along a longest axis direction of the cross section (i.e., along a widest diameter). The direction of the computed diameter can be indicated on the display device 810 by using, for example, two 3D arrow indicators 710, and the user can maneuver those indicators 710 to specify the specific diameter (and its direction) to be computed/displayed. Measurement 720 of the approximated diameter can be presented on the display device 801. Additionally, the user 821 can operate the user interface 804 to interactively adjust the direction of the diameter along the cross-sectional area 710 to get a more meaningful measurement by, for example, dragging or otherwise moving the 3D arrow indicators 710 and turning them around, and the like, in order to take the diameters along different desired directions.

Figure 7C:
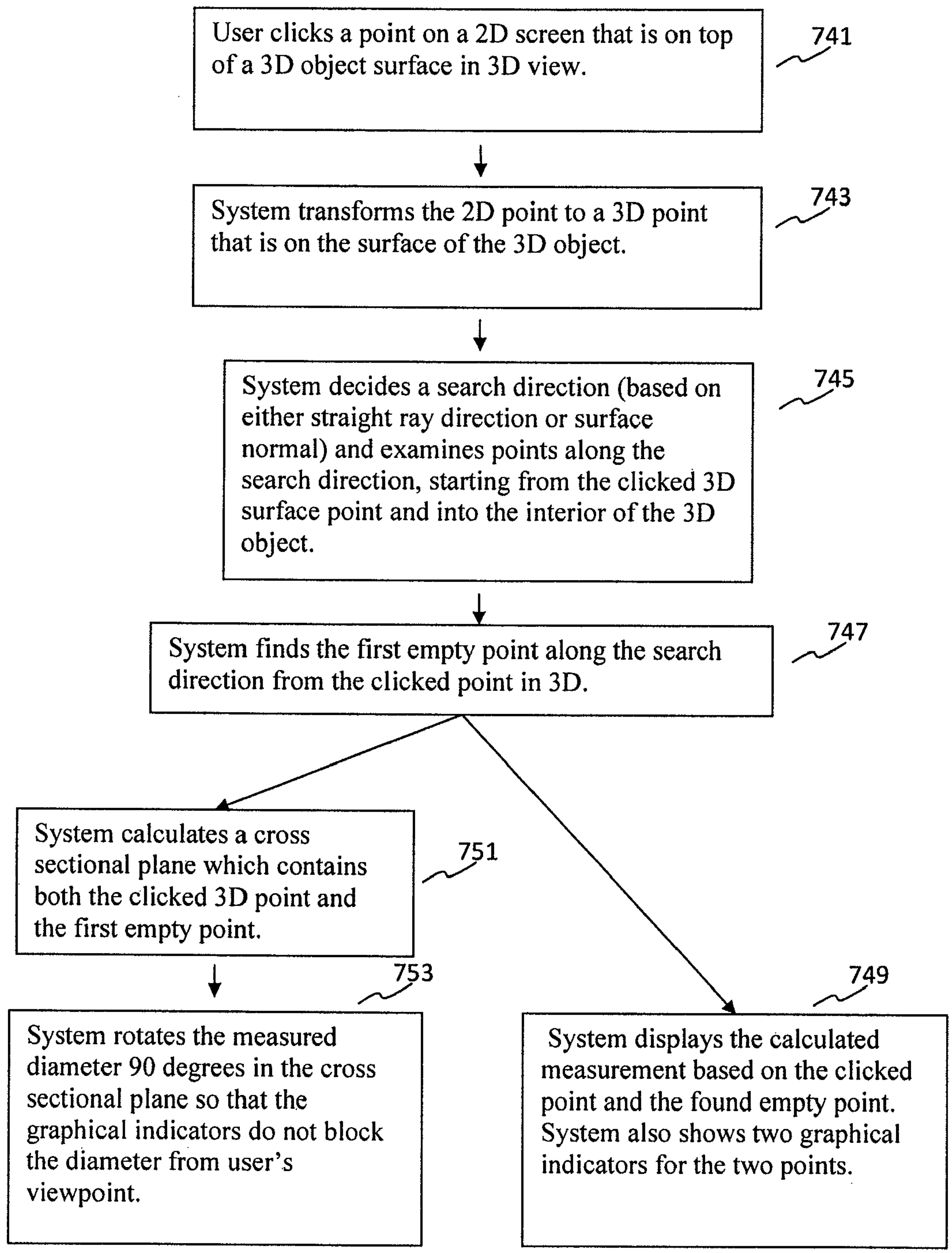

During a resection planning, in addition to determining the diameter of a resection or cut surface cross section, it also may be desired to obtain diameters along other cross sections, such, as, for example, other parts of a vascular branch of interest. Reference will now be made to FIGS. 7(*b*)-1 to 7(*b*)-4 which depict an exemplary workflow representing how the diameter of a tube-like structure can be determined, according to an exemplary embodiment herein. Those Figures may represent respective views presented on display device 101 (FIG. 1), in one example. It should be noted that, although described in the context of a tube-like structure, the below procedure is not limited for use only with such a structure, and it is within the scope hereof to determine the diameter of other types of structures as well.

In FIG. 7(*b*)-1, a thin tube-like structure 732 (such as a vessel) is depicted, residing in 3D space 731. In FIG. 7(*b*)-2, the user operates the user interface 804 to select point 733 on a surface of the structure 732 where the user wishes to have the diameter of the structure 732 determined. In response, the system 800 (using, e.g., module 819) calculates the diameter of the structure 732, at a cross section of the structure 732, defined by the location where the point 733 was selected by the user. FIG. 7(*b*)-3 indicates the diameter by reference numeral 736, and the location of that diameter 736 is further indicated by arrow indicators 734, 735. The value (e.g., 2 mm) of the diameter calculated by the system 800 is represented by reference numeral 737, and is presented to the user by way of the display device 101.

The structure 732 of FIG. 7(*b*)-3 (or just the diameter itself) is shown as being rotationally offset relative to that in structure 732 of FIG. 7(*b*)-2. Such an offset may (or may not) be represented on the display device 101, and can be provided either automatically or in response to user instruction. FIG. 7(*b*)-4 represents a further rotational offset with respect to that shown in FIG. 7(*b*)-3, that can be effected automatically or upon user instruction. Arrow indicators that are shown as further rotated in that Figure (relative to in FIG. 7(*b*)-3) are identified by reference numerals 738, 739. By virtue of rotating the structure 732 and/or the diameter as shown in FIGS. 7(*b*)-3 and/or 7(*b*)-4, the user can perceive both ends of the diameter right away without obstruction from arrow indicators, and, in the case of automatic rotation by the system 800, in one example the user does not need to take any action to effect the rotation besides specifying (e.g., in a "single click") that the diameter be determined. Even where, in some cases, the rotated diameter is not exactly the same as the diameter in an initial orientation (i.e., FIG. 7(*b*)-2), the diameter values still may be very close in value, particularly for, e.g., a tube-like thin structure.

In one exemplary embodiment, to obtain a diameter from a single click selection point, such as point 733, the system 800 finds the proper direction for measurement using, in one example, a straight ray direction of the clicked point with respect to (i.e., substantially perpendicular to) the viewer. However, for a more precise measurement in a case where the point selected by the user is off-center in the structure 732, in another exemplary embodiment a 3D surface normal to the selected point 733 is employed to determine the diameter, or a 3D surface normal to a smoothed surface patch may be employed for additional robustness of the measurement (e.g., in one example, the normal can be calculated based on a graphical mesh representation of the surface). The end of the diameter opposite to where the user made the selection can be obtained by the system 800 searching from the selected point, along an inverse direction of the surface normal to the selected point, until an empty point is encountered (i.e., until a region outside of the opposite surface of the structure 732 is reached). In one example, the foregoing determinations are made by the system 800 automatically and in real-time, although in other embodiments they need not be.

As described above, the diameter can be rotated, as represented in FIGS. 7(*b*)-3 and 7(*b*)-4. The system 800 can rotate the diameter measurement using any suitable technique, such as, e.g., defining a cross sectional plane that contains an imaginary line composed of the selected point 733 and the surface normal vector. There may be unlimited choices since there are an unlimited number of planes that pass through this line. The system 800 can find a plane that is orthogonal to a center line direction of the tube-like thin structure 732. To even further ensure use of a reliable center line of the tube-like thin structure, despite possible shape variations or tiny noisy structures on the surface that may affect center line extraction, additional techniques can be employed, such as, for example, a brute-force search scheme that determines the rotated diameter measurement, or other suitable techniques.

In one exemplary embodiment, from the center of the original diameter measurement, the system 800 searches in directions that are perpendicular to the original diameter measurement direction. The directions are spread in a half circle with a few degrees of separation. In each direction, the system searches from the center to at least two directions and finds the empty points. The length of the (two) ends besides the empty spots is calculated for each instance. In one example, the direction of the minimum calculated length is used as the rotated diameter measurement. One rationale of this approach is that the plane perpendicular to the center line of the tube-like thin structure 732 should have a cross-sectional circular disk that has the smallest radius. By searching at least some of these kinds of cross-sectional circular disks, a smallest one can be used as a correct cross-section. Also the computation cost is low since the system 800 only needs to sample a limited number of angles in a half circle.

FIG. 7(*c*) is an example of a flow diagram of the above operation. This technique takes advantage of the 3D view 102 in the system 800. The user 821 can select a point that is on a displayed 3D object (step 741). For example, the user 821 may select a point, on 2D view 103, that is on the 3D object surface in 3D view 102. In step 743, the system 800 then transforms this 2D point to an actual 3D point using 2D/3D transformation mechanism 809. The system 800 then determines a search direction (e.g., based on either a straight ray direction or a surface normal), and examines points along the search direction, starting from the 3D point and into the interior of the 3D object (step 745). Based on the 3D point and search direction (e.g., straight viewing direction or surface normal), in step 747, the system 800 can search the other end of the measurement based on the presence of the 3D object by, for example, finding a first empty point along the search direction from the 3D point. Then, in step 749, the system 800 displays the measurement result (or diameter) with two end points indicator and the value of the measurements. Alternatively, to be even more user friendly, the system 800 can find a reasonable cross sectional plane that contains the measurement (e.g., the 3D point and the first empty point (step 751). Then the system 800 rotates the measurement by 90 degrees (or another predetermined angle) within the cross sectional plane so that the end point indicators do not block the view of the measurement segment from the user point of view, and, in one example, this can be done without any further scene rotation being selected by the user (step 753).

Figure 9:
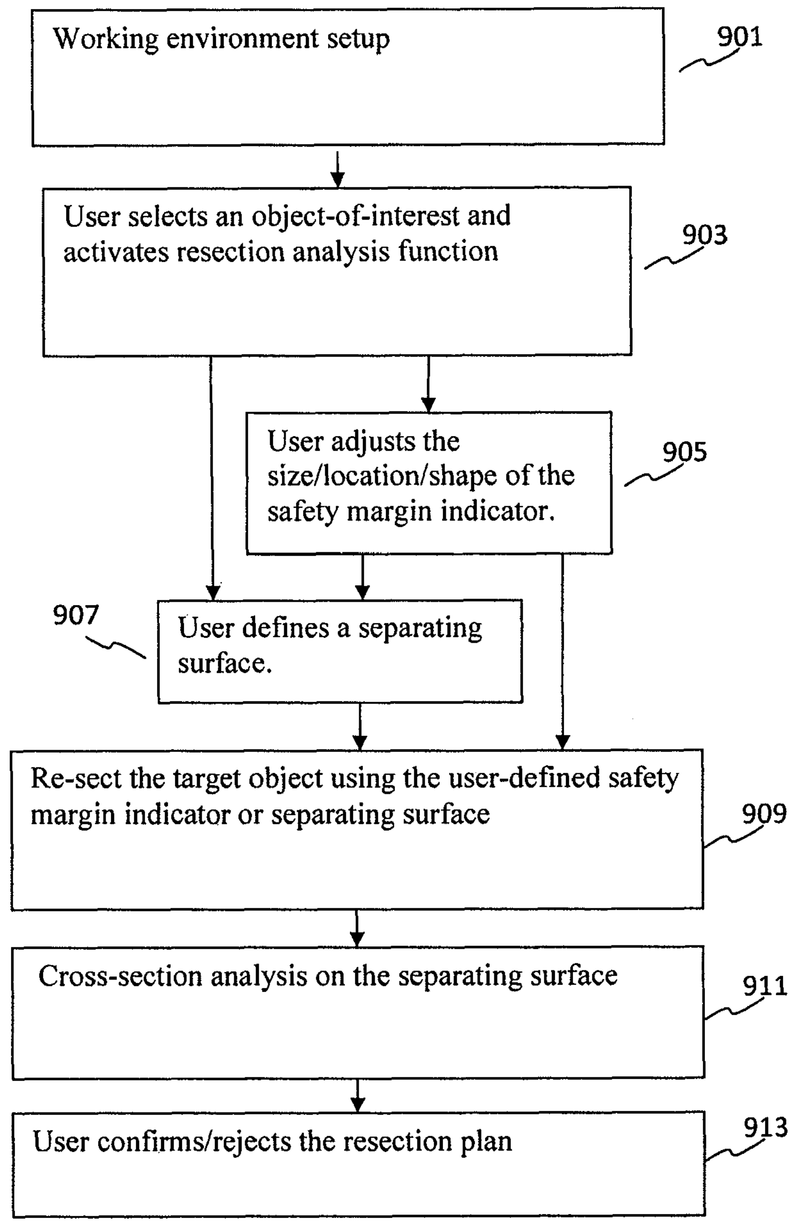
FIG. 9 depicts a flow diagram for resection planning and/or resection, according to an exemplary embodiment herein.

FIG. 9 depicts a flow diagram for pre-operative planning, according to an exemplary embodiment herein. The present example is described in the context of resection planning, although it can be employed in conjunction with other types of (pre-)operative assessments as well. At step 901, data and segmented objects, such as, e.g., one or more anatomical structures, are loaded and displayed on a display device (e.g., display device 101) in an exemplary screen layout. At step 903, a user (e.g., user 821) selects at least one displayed object-of-interest and activates a resection analysis function. For an example case involving hepatic lesion resection planning, the object-of-interest may be, e.g., one or multiple hepatic lesions to be re-sectioned. A safety margin indicator (e.g., 201) is shown on the display device surrounding the object-of-interest.

At step 905, the user operates a user interface (e.g., 804) to adjust the size, location, shape, and/or orientation, etc. of the safety margin indicator, as described above. The safety margin indicator is instantaneously updated and displayed in both 3D and 2D views on a display (e.g., 101), in accordance with the adjustment. The system (e.g., 800) may also update the display of (e.g., appearance and/or color) vital anatomies that are within (or which touch) the adjusted safety margin.

At step 907, the user operates a user interface (e.g., 804) to define at least one resection cutting surface using, for example, one or more of the separating surface definition methods previously described. At this step, the system (e.g., 800) also can display in 3D and 2D views the user-confirmed safety margin (e.g., 201), vascular systems, biliary systems, and vascular/biliary territories, as well as intensity information contained in original images. Such information can be helpful to enable the user to best determine a resection surface. At step 909, the system (e.g., 800) separates (on a display device, such as device 101 of FIG. 1) the target object using the user defined/confirmed safety margin and/or separating surface, in response to user instruction. A volume of each part of the target object after resection is automatically calculated, in a manner as described above. For example, in a case involving a hepatic lesion resection, a volume of the liver sub-volume to be re-sectioned and a volume of the remnant are calculated, respectively. The user can visualize these elements in 3D and 2D views and evaluate the vascular/biliary territories on the remaining liver, by virtue of the presentation on the display device (e.g., 110). Such information can be helpful for resection planning.

At step 911, cross-sections (e.g., 710) of the resection surface, as well as the cross-sections of the vital anatomies on the resection surface, are analyzed. For example, sizes, diameters, and other dimensional characteristics of the cross-sections of vital anatomies on the resection surface can be automatically or manually measured and displayed, as described above. For each vascular/biliary branch that may be re-sectioned by the resection surface, for example, the system (e.g., 800) can automatically calculate the branch's diameter for the user's reference. At step 913, the user can elect to confirm the resection plan and save its results if the current plan is deemed clinically and surgically acceptable. Such results can be saved in a storage device (e.g., 808) of the system (e.g., 800) and reported or forwarded to another external device by way of a communication interface (not shown) and network (not shown). The user instead can reject the current resection plan in step 913.

By virtue of the foregoing method, pre-operative assessments can be made in an intuitive, interactive, and real-time manner, to facilitate hepatic lesion/tumor resection planning based upon quantitative assessment and evaluation of anatomic structures and the like. Owing to the system 800, apparatus, procedure(s), and program(s) described herein, a working environment is provided that fuses 3D and 2D information to perform efficient resection evaluation and analysis, without requiring unwieldy, intrusive, and often difficult-to-obtain equipment, such as stereo goggles and special 3D tracking devices and the like. As such, the system 800 is an easier to use, stand-alone 3D system having the functionalities and performance capabilities described herein.

Again, the example aspects described herein provide an integrated 3D visual environment, tools, and interactive schemes for assessment measurements such as safety margin adjustment and visualization, vessel alternation visualization, region open and close animation, and direct vessel diameter measurement. A 3D working environment is provided for these pre-operative assessments, rendering them more easily to operate and more intuitive to understand in 3D in nature, relative to conventional practices.

In the foregoing description, example aspects of the invention are described with reference to specific example embodiments thereof. The specification and drawings are accordingly to be regarded in an illustrative rather than in a restrictive sense. It will, however, be evident that various modifications and changes may be made thereto, in a computer program product or software, hardware, or any combination thereof, without departing from the broader spirit and scope of the present invention.

Software embodiments of example aspects described herein may be provided as a computer program product, or software, that may include an article of manufacture on a machine accessible or machine readable medium (memory) having instructions. The instructions on the machine accessible or machine readable medium may be used to program a computer system or other electronic device. The machine-readable medium may include, but is not limited to, floppy diskettes, optical disks, CD-ROMs, and magneto-optical disks or other types of media/machine-readable medium suitable for storing or transmitting electronic instructions. The techniques described herein are not limited to any particular software configuration. They may find applicability in any computing or processing environment. The terms "machine accessible medium", "machine readable medium", or "memory" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result. In other embodiments, functions performed by software can instead be performed by hardcoded modules, and thus the invention is not limited only for use with stored software programs.

In addition, it should be understood that the figures illustrated in the attachments, which highlight the functionality and advantages of the present invention, are presented for example purposes only. The architecture of the example aspect of the present invention is sufficiently flexible and configurable, such that it may be utilized (and navigated) in ways other than that shown in the accompanying figures.

Although example aspects of this invention have been described in certain specific embodiments, many additional modifications and variations would be apparent to those skilled in the art. It is therefore to be understood that this invention may be practiced otherwise than as specifically described. Thus, the present example embodiments, again, should be considered in all respects as illustrative and not restrictive.

What is claimed is:

1. A procedure for operating an imaging system to perform pre-operating assessment of one or more anatomical structures generated from medical images and provided in a rendered 3D space, comprising:

forming one or more safety margin indicators in the rendered 3D space, in response to input information provided by a user via a user input interface, each defining a 3D closed-volume shape that is deformable and adjustable to conform to a predetermined shape of a respective one of the anatomical structures within an organ and being spaced around the respective one of the anatomical structures in the rendered 3D space by a predetermined safety margin distance from the respective one of the anatomical structures;

deforming the 3D closed-volume shape and the predetermined safety margin distance of at least one of the safety margin indicators in the rendered 3D space by operation of graphical handlers of the user input interface; and immediately providing, in a user-perceptible output interface of the imaging system, a rendering in the 3D space of a manipulated version of the at least one safety margin indicator, wherein at least one foregoing step of the procedure is performed by a computer processor operating under control of a computer program stored on non-transitory computer-readable media.

2. A procedure according to claim 1, wherein the safety margin indicator is provided in a 2D view on the medical images, rendered in its original form or processed form, and in a 3D view.

3. A procedure according to claim 1, wherein the deforming includes adjusting at least one of the shape and location of the at least one safety margin indicator.

4. A procedure according to claim 1, further comprising providing at least one numerical dimension of the safety margin indicator.

5. A procedure according to claim 1, further comprising changing at least one of a color and an appearance of a 3D rendering of at least one of the anatomical structures.

6. A procedure according to claim 1, wherein the deforming is performed via a user interface.

7. A procedure according to claim 1, further comprising masking from the organ at least one of the anatomical structures and other intra-organ anatomical structures using an associated one or more of the safety margin indicators.

8. A procedure according to claim 7, further comprising providing an indicator of a quantified measurement of at least one of the organ and a remnant organ.

9. A procedure according to claim 1, further comprising providing an indicator of at least one of a distance between at least two of the safety margin indicators and a distance between at least one of the safety margin indicators and at least one of the anatomical structures within the organ.

10. An imaging system for performing pre-operative assessment of one or more anatomical structures generated from medical images and provided in a rendered 3D space, comprising:

an output user interface arranged to form one or more safety margin indicators in the rendered 3D space, in response to input information provided by a user via a user input interface, each defining a 3D closed-volume shape that is deformable and adjustable to conform to a predetermined shape of a respective one of the anatomical structures within an organ and being spaced around the respective one of the anatomical structures in the rendered 3D space by a predetermined safety margin distance from the respective one of the anatomical structures; and at least one computer processor, operating under control of a computer program stored on non-transitory computer-readable media, to deform the 3D closed-volume shape and the predetermined safety margin distance of at least one of the safety margin indicators in the rendered 3D space by operation of graphical handlers of the user input interface, and immediately provide, in a user-perceptible output interface of the imaging system, a rendering in the 3D space of a manipulated version of the at least one safety margin indicator.

11. An imaging system according to claim 10, wherein the output user interface provides the safety margin indicator in a 2D view on the medical images, rendered in its original or processed form, and in a 3D view.

12. An imaging system according to claim 10, wherein the at least one computer processor is operable to adjust at least one of the shape and location of the at least one safety margin indicator.

13. An imaging system according to claim 10, wherein the at least one computer processor also is operable to change at least one of a color and an appearance of a 3D rendering of the at least one of the safety margin indicators.

14. An imaging system according to claim 10, further comprising an input user interface operable to control the at least one computer processor to manipulate the at least one safety margin indicator.

15. A procedure according to claim 1, wherein the deforming includes adjusting a size of the at least one safety margin indicator.

16. A procedure according to claim 1, wherein the deforming includes dragging a border of the at least one safety margin indicator.

17. A procedure according to claim 1, further comprising adjusting a center of the at least one safety margin indicator.

18. A procedure according to claim 1, wherein the immediately providing is performed based on a zoom factor in a rendering transformation of a 3D computer graphics library.

19. A procedure according to claim 5, wherein the changing is performed in response to one of (a) the at least one safety margin indicator touching the at least one of the anatomical structures, (b) the at least one safety margin indicator overlapping the at least one of the anatomical structures, or (c) the at least one of the anatomical structures being enclosed within the at least one safety margin indicator.

20. A procedure according to claim 1, further comprising determining a volume of at least one of (a) the organ or (b) at least one of the anatomical structures.

* * * * *